(12) United States Patent
Hoffer et al.

(10) Patent No.: US 6,893,153 B2
(45) Date of Patent: May 17, 2005

(54) TEMPERATURE-INDICATING POWER ADAPTER AND ELECTRONIC DEVICE THAT OPERATES THEREWITH

(75) Inventors: Cary J Hoffer, Albany, OR (US); James F Bausch, Salem, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 10/187,189

(22) Filed: Jun. 28, 2002

(65) Prior Publication Data

US 2004/0001526 A1 Jan. 1, 2004

(51) Int. Cl.[7] .................... G01K 13/00; G01K 1/08; G01K 07/00
(52) U.S. Cl. .................. 374/152; 374/183; 374/208; 374/141
(58) Field of Search ................ 374/141, 162, 374/152, 159, 183, 185, 208; 116/207

(56) References Cited

U.S. PATENT DOCUMENTS

| 4,121,462 A | * | 10/1978 | Mohrman | 374/163 |
|---|---|---|---|---|
| 4,156,365 A | * | 5/1979 | Heinmets et al. | 374/162 |
| 4,249,697 A | * | 2/1981 | Savage, Jr. | 374/112 |
| 4,278,970 A | * | 7/1981 | Streczyn et al. | 374/185 |
| 4,459,046 A | * | 7/1984 | Spirg | 374/162 |
| RE31,715 E | * | 10/1984 | Coates et al. | 374/162 |
| 4,576,487 A | * | 3/1986 | Conover et al. | 374/183 |
| 4,891,250 A | * | 1/1990 | Weibe et al. | 374/162 |
| 5,249,141 A | * | 9/1993 | Vandebroek et al. | 702/132 |
| 5,355,123 A | * | 10/1994 | Nishiura et al. | 340/653 |
| 5,532,524 A | * | 7/1996 | Townsley et al. | 307/64 |
| 5,588,747 A | * | 12/1996 | Blevins | 374/162 |
| 5,699,239 A | * | 12/1997 | Komori | 363/21.07 |
| 5,841,204 A | * | 11/1998 | English | 374/132 |
| 5,841,285 A | * | 11/1998 | Bailey | 374/162 |
| 5,997,964 A | * | 12/1999 | Klima, Jr. | 428/1.54 |
| 6,005,484 A | * | 12/1999 | Ko | 340/662 |
| 6,078,511 A | * | 6/2000 | Fasullo et al. | 363/50 |
| 6,114,941 A | * | 9/2000 | Scott | 337/332 |
| 6,243,276 B1 | * | 6/2001 | Neumann | 363/53 |
| 6,266,261 B1 | * | 7/2001 | Lanni | 363/144 |
| 6,307,746 B1 | * | 10/2001 | Beckman | 361/687 |
| 6,437,543 B1 | * | 8/2002 | Oter et al. | 320/150 |
| 2002/0038795 A1 | * | 4/2002 | Katooka et al. | 219/130.21 |
| 2002/0079866 A1 | * | 6/2002 | Odaohhara | 320/150 |
| 2003/0024465 A1 | * | 2/2003 | Perner et al. | 116/217 |
| 2003/0103366 A1 | * | 6/2003 | MacDonald et al. | 363/131 |
| 2003/0231695 A1 | * | 12/2003 | Cheah | 374/141 |

FOREIGN PATENT DOCUMENTS

| EP | 0432486 A1 | * | 6/1991 | 374/101 |
|---|---|---|---|---|
| GB | 2034033 A | * | 5/1980 | G01K/11/16 |
| GB | 2199981 A | * | 7/1988 | 374/162 |

* cited by examiner

*Primary Examiner*—Diego Gutierrez
*Assistant Examiner*—Mirellys Jagan
(74) *Attorney, Agent, or Firm*—Jeff D. Limon

(57) ABSTRACT

A temperature-indicating power adapter includes a case, a conversion module coupled to the case that receives a first voltage and produces a second voltage. The adapter also includes a temperature-indicating device that is also coupled to the case for indicating the temperature of the case.

15 Claims, 5 Drawing Sheets

TEMPERATURE-INDICATING POWER ADAPTER AND ELECTRONIC DEVICE THAT OPERATES THEREWITH

BACKGROUND OF THE INVENTION

Many battery-powered electronic devices can be operated using an alternating current (AC) source converted to a direct current (DC) voltage by way of a suitable power adapter. This allows the user to make use of "house power" to operate the electronic device, thus avoiding the need to constantly be attentive to the discharge state of the battery. Many battery-powered electronic devices also include a battery charging unit that charges the battery while the electronic device is coupled to the alternating current source. This provides a convenient means of charging a depleted battery while operating the electronic device.

Many power adapters used with portable electronic devices generate a noticeable amount of heat during the conversion from AC to DC. Thus, when the power adapter is placed external to the electronic device, the user may notice that the power adapter is warm during the operation of the device. As electronic devices continue to increase in capability, the devices tend to require larger and larger amounts of DC current. Further, as many portable electronic devices as well as their attendant power adapters continue to decrease in size, the smaller-sized power adapters may become increasingly warm to the touch as the adapter is required to dissipate increasing amounts of heat.

Although power adapters can be designed to safely operate at an elevated temperature, many users are likely to assume that the power adapter is functioning improperly if the power adapter feels warm or hot when touched. This inclines many users to return their power adapters to the manufacturer even though the adapter is functioning well within its operating specifications. These false returns represent an increased cost to the manufacturer, which invariably is passed on to the consumer in the form of more expensive battery powered electronic devices and their attendant power adapters.

DESCRIPTION OF THE PREFERRED EMBODIMENTS

Figure 1:
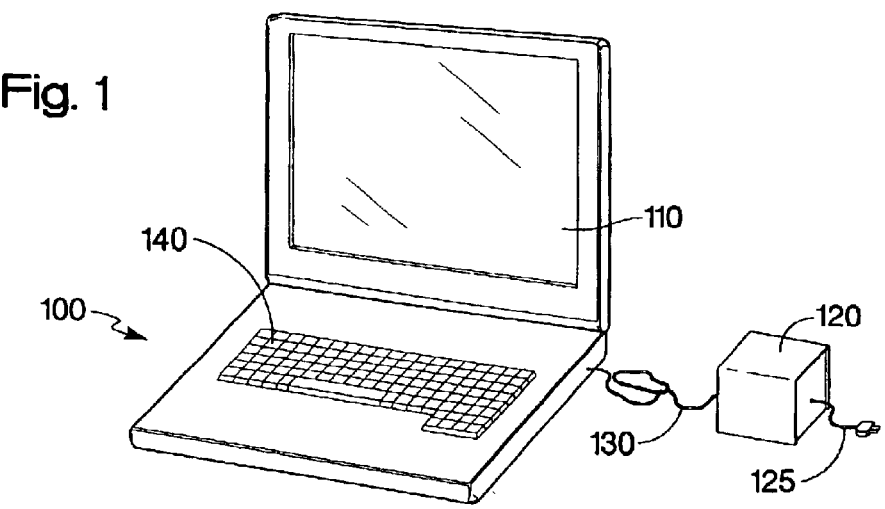
FIG. 1 is a computing unit and a power adapter according to an embodiment of the invention.

FIG. 1 is a computing unit and a power adapter according to a first embodiment of the invention. In FIG. 1, computing unit 100 represents any one of several types of computing units used for general-purpose or specialized computing functions. Computing unit 100 can also represent any other type of electronic device that performs at least a minimum of processing functions such as enabling electronic games, Internet Web browsing, voice and/or data communications, and a variety of other functions. In the embodiment of FIG. 1, computing unit 100 includes keyboard 140 that receives user inputs to control the operation of the unit. Computing unit 100 further includes display 110 that displays information to the user. Computing unit 100 is contemplated as being powered by way of a battery located internal to the unit or by way of a DC input from power adapter 120, which converts an AC input from AC input cord 125 to a DC output on DC output cord 130.

Figure 2:
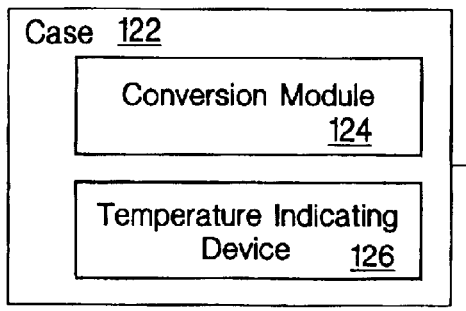
FIG. 2 is a block diagram of the power adapter shown in FIG. 1 according to an embodiment of the invention.

FIG. 2 is a block diagram of power adapter 120 shown in FIG. 1 according to an embodiment of the invention. In FIG. 2, case 122 houses conversion module 124 and temperature-indicating device 126. Conversion module 124 performs the conversion of an AC input to a DC output using any one or more of several well-known techniques. During the conversion process, case 122 receives and dissipates an amount of excess heat generated by conversion module 124. Case 122 may be constructed using a variety of materials but preferably includes a material capable of dissipating at least a substantial portion of the excess heat generated by conversion module 124. As case 122 receives the excess heat, temperature-indicating device 126 provides an indication of the temperature of at least a portion of case 122. This indication is preferably noticed by a user of computing unit 100 thereby providing the user with feedback as to the temperature of power adapter 120. As further illustrated in the description of FIG. 3, herein, the indication can be conveyed visually to the user in a variety of ways.

FIGS. 3a–3e are illustrations of the cases of several power adapters showing various ways of visually indicating the temperature of the case according to embodiments of the invention. In FIGS. 3a–3e, power adapters 120a–120e, as well as cases 122a–122e perform power conversion and heat dissipation functions in a manner that accords with power adapter 120 and case 122 as described in FIG. 2.

Figure 3A:
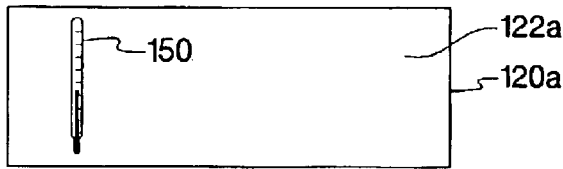
FIGS. 3a–3e are illustrations of the cases of several power adapters showing various ways of visually indicating the temperature of the case according to embodiments of the invention.

In FIG. 3a, alcohol thermometer 150 is affixed to case 122a of power adapter 120a in order to measure and provide a visual indication of the temperature of case 122a over a predetermined range. In other embodiments, alcohol thermometer 150 can be replaced by any other type of thermometer in which a liquid, gas, or plasma expands when heated and contracts when cooled.

Figure 3B:
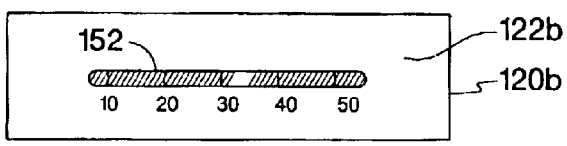

In FIG. 3b, thermochromic liquid crystal thermometer 152 is affixed to case 122b of power adapter 120b. Liquid crystal thermometer 152 measures the temperature of case 122b and provides a visual indication of the temperature to the user over a predetermined temperature range. Liquid crystal thermometer 152 can be designed so that the number that most closely corresponds to the current case temperature appears illuminated, thereby allowing the user to quickly determine the temperature of case 122b.

Figure 3C:
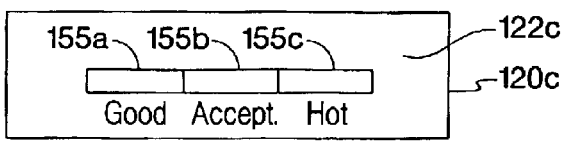

In FIG. 3c, three thermochromic materials 155a, 155b, and 155c, are affixed to case 122c of power adapter 120c along a particular direction. The thermochromic strips used in FIG. 3c may a include liquid crystal material similar to liquid crystal thermometer 152 or may make use of any other type of thermochromic material. In this embodiment, thermochromic material 155a changes color (such as from black to green) when case 122c is within a first temperature range, indicating a favorable ("Good") temperature range. Thermochromic material 155b changes color (such as from black to yellow) when case 122c reaches a second temperature, indicating that the case has reached a temperature within a less favorable ("Acceptable") range, which is contemplated as being higher than the "Good" range. When case 122c further increases in temperature, thermochromic material 155c changes color (such as from black to red) to indicate that the case has reached a temperature that exceeds the normal operating range ("Hot").

Thermochromic materials 155a, 155b, and 155c can be materials similar to those used in heat-sensitive beverage containers (such as ceramic coffee mugs) in which a design on the exterior of the container is modified when a hot liquid is poured into the container. Those skilled in the art are aware of thermochromic materials and the application of these materials to surfaces such as case 122c.

Figure 3D:
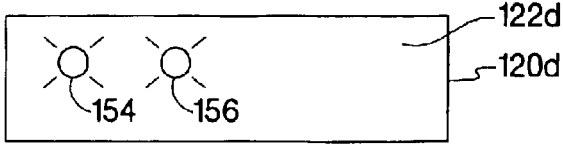
Figure 3E:
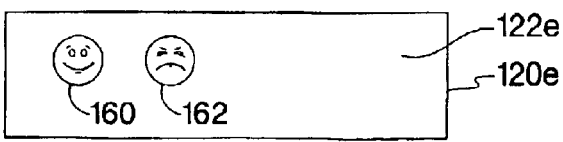

In FIGS. 3d and 3e, light sources 154 and 156 (of FIG. 3d) and light sources 160 and 162 (of FIG. 3e) present a visual indication for temperatures within a first temperature range and present a second visual indication for temperatures that are within a second temperature range. In FIG. 3d, light source 154 may emit green light to indicate a case temperature that is within a normal temperature range, while light source 156 may emit red light to indicate a case temperature above the normal temperature range.

In FIG. 3e, light sources 160 and 162 include a transparent material on which an emoticon or other symbol has been painted or applied in another manner. In FIG. 3e, the transparent material used with light source 160 includes an emoticon that displays a happy face, which indicates a case temperature within a normal operating range. The transparent material used with light source 162 includes an emoticon or other symbol that displays a sad face, which indicates a case temperature that is outside the normal operating range.

Referring back to FIG. 3d, although two temperature-indicating light sources are used, nothing prevents the use of a single light source that presents different colors according to the temperature of case 122d. Thus, the single light source may illuminate in one color while the temperature of case 122d resides at a normal temperature range and may illuminate in another color when the temperature of case 122d resides outside of the normal range. In another embodiment, a single light having a single color may be illuminated only after the temperature of case 122d has risen to a value outside the normal temperature range.

Figure 4:
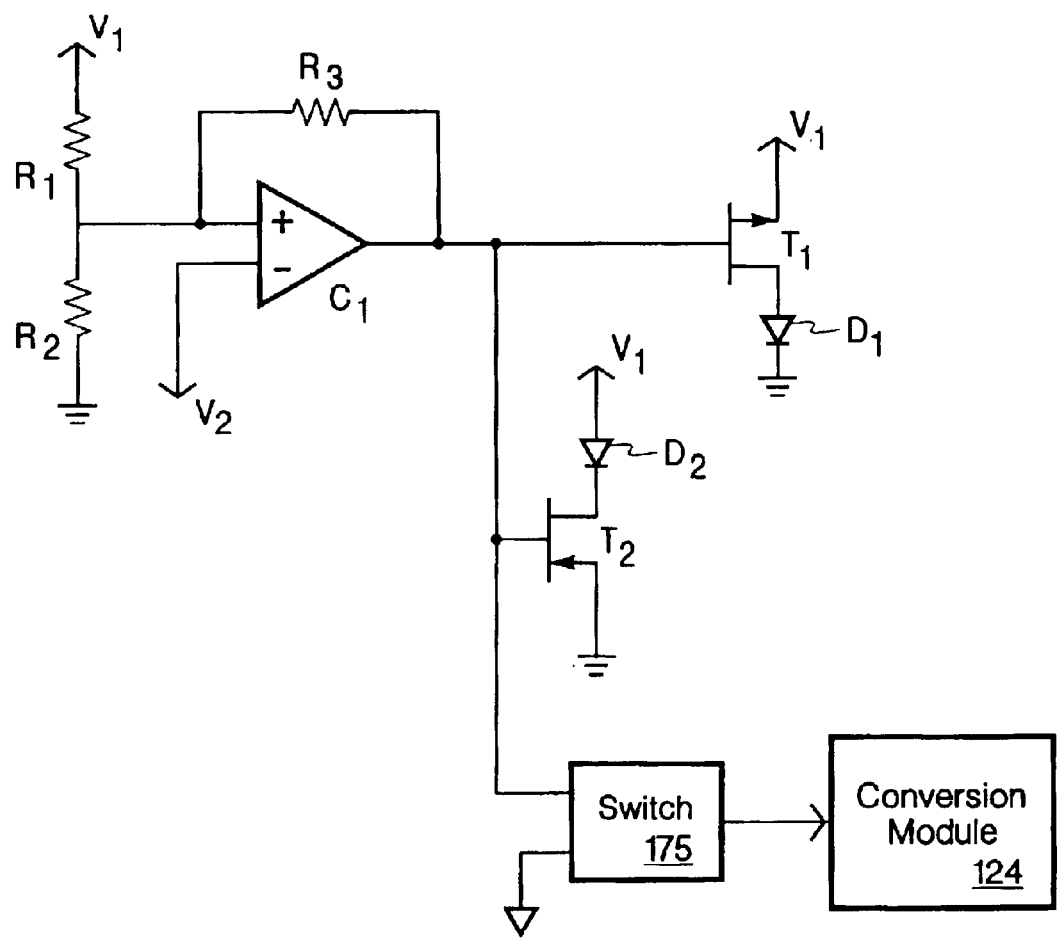
FIG. 4 is an electrical circuit diagram that may be used in bringing about the embodiments of FIGS. 3d and 3e.

FIG. 4 is an electrical circuit diagram that can be used in bringing about the embodiments of FIGS. 3d and 3e. In FIG. 4, V1 represents a rail voltage, which supplies power to biasing resistors R1 and R2, as well as transistors T1 and T2. Although not shown, V1 is also used to supply voltage to comparator C1. In FIG. 4, resistor R2 represents a resistor having a negative temperature coefficient. Thus, as the temperature of R2 increases, the resistance value of resistor R2 decreases. Preferably, R2 is affixed to a portion of the case that houses a conversion module that converts an AC input to a DC output, such as conversion module 124 of FIG. 2.

In the embodiment of FIG. 4, as the case of the power adapter increases in temperature beyond a predetermined value (indicating an abnormal operating condition) the value of R2 drops below a predetermined amount. When the value of R2 drops below the predetermined amount, the voltage presented to comparator C1 drops below the value of reference voltage V2. When this occurs, the output of C1 switches from a high to a low value, which, in turn, causes a current to flow through P-channel field-effect transistor T1.

As current flows through T1, light-emitting diode D1 is illuminated. The low value of the output of comparator C1 also switches N-channel field-transistor T2 to an "off" state, thus extinguishing light emitting diode D2. In this embodiment, light-emitting diode D1 corresponds to light source 156 of FIG. 3d or to light source 162 (sad face) of FIG. 3e.

As the temperature of the case decreases (indicating a return to normal operating conditions) the resistance of negative temperature coefficient resistor R2 increases until a sufficiently high resistance is reached. As resistor R2 increases, the voltage presented at the input of comparator C1 increases to a value that exceeds reference voltage V2. When the input exceeds V2, the output of comparator C1 switches to a high value, thus causing N-channel field-effect transistor T2 to switch to a high state. The output of comparator C1 also causes current flow through P-channel field-effect transistor T1 to be decreased, thus extinguishing light-emitting diode D1. As current flows through N-channel field-effect transistor T2, light-emitting diode D2 is illuminated. In this embodiment, light-emitting diode D2 corresponds to light source 154 of FIG. 3d or to light source 160 (happy face) of FIG. 3e.

Hysteresis resistor R3 is used to control the switching between the high and low states of the output of comparator C1 according to conventional techniques. Lower values of R3 produce more significant hysteresis about the reference voltage V2, while larger values of R3 produce less hysteresis about V2.

The outputs of comparator C1 can also be coupled to switch 175, which is capable of interrupting the DC output of conversion module 124. Thus, as the output of comparator C1 becomes low enough to illuminate light-emitting diode D1, indicating a case temperature above the normal range, switch 175 can be switched in order to substantially eliminate the direct current output from conversion module 124. This arrangement allows the automatic shut down of the power adapter when the case temperature increases beyond a predetermined amount.

Although the electrical circuit of FIG. 4 makes use of a resistor (R2) having a negative temperature coefficient, nothing prevents the use of a resistor having a positive temperature coefficient. In this embodiment, an increase in the case temperature causes an increase in the resistance of resistor R2, thus causing the output of comparator C1 to enter the high state when the case temperature exceeds a predetermined value. When the case temperature decreases to a value that is below the predetermined value, the output of comparator C1 enters a low state. Accordingly, the placement of light-emitting diodes D1 and D2 are preferably transposed so that light sources 156 or 162 indicate a high temperature condition while light sources 154 or 160 indicate the normal case temperature condition.

Figure 5:
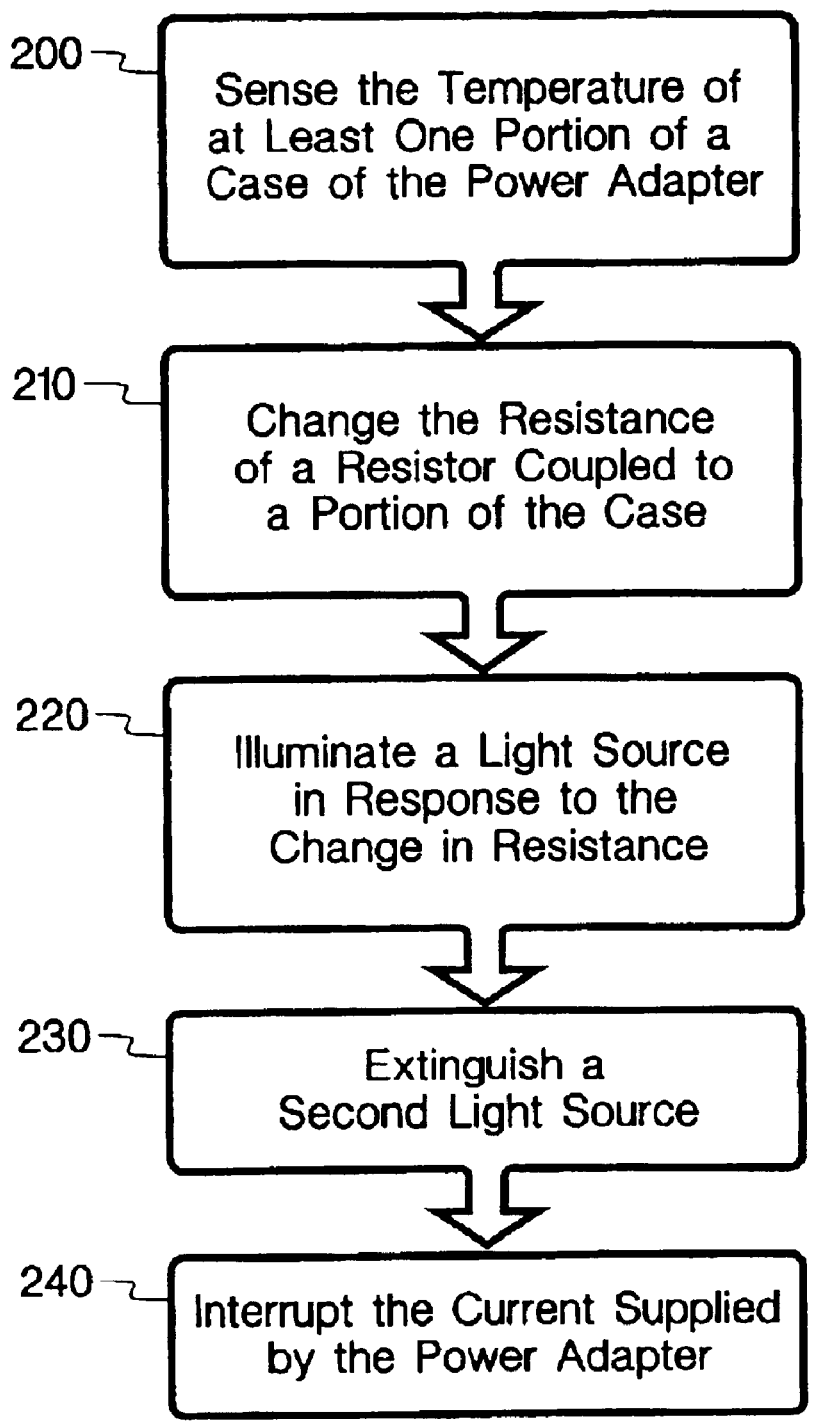
FIG. 5 is a method of indicating a power adapter temperature according to an embodiment of the invention.

FIG. 5 is a method of indicating a power adapter temperature according to an embodiment of the invention. The method of FIG. 5 begins at step 200, which includes sensing a temperature of a portion of a case of the power adapter. The method continues at step 210 in which the resistance of a resistor coupled to a portion of the case is decreased, such as through the use of a negative temperature coefficient resistor. The message continues at step 220 in which a light source is illuminated in response to the change in resistance. The method may continue at step 230 in which a second light source is extinguished in response to the change in resistance. The method of FIG. 5 may continue at step 240 in which the current supplied by the power adapter is interrupted based on temperature sensed in step 200.

In some embodiments, steps 200, 210, and 220 need only be performed. Thus, a method of indicating that a power adapter has increased in temperature beyond a predetermined value may only comprise sensing a temperature of at least one portion of a case of the power adapter (step 200), changing the resistance of at least one resistor coupled to the at least one portion of the case (step 210), and illuminating a light source in response to the change in the resistance (step 220).

Figure 6:
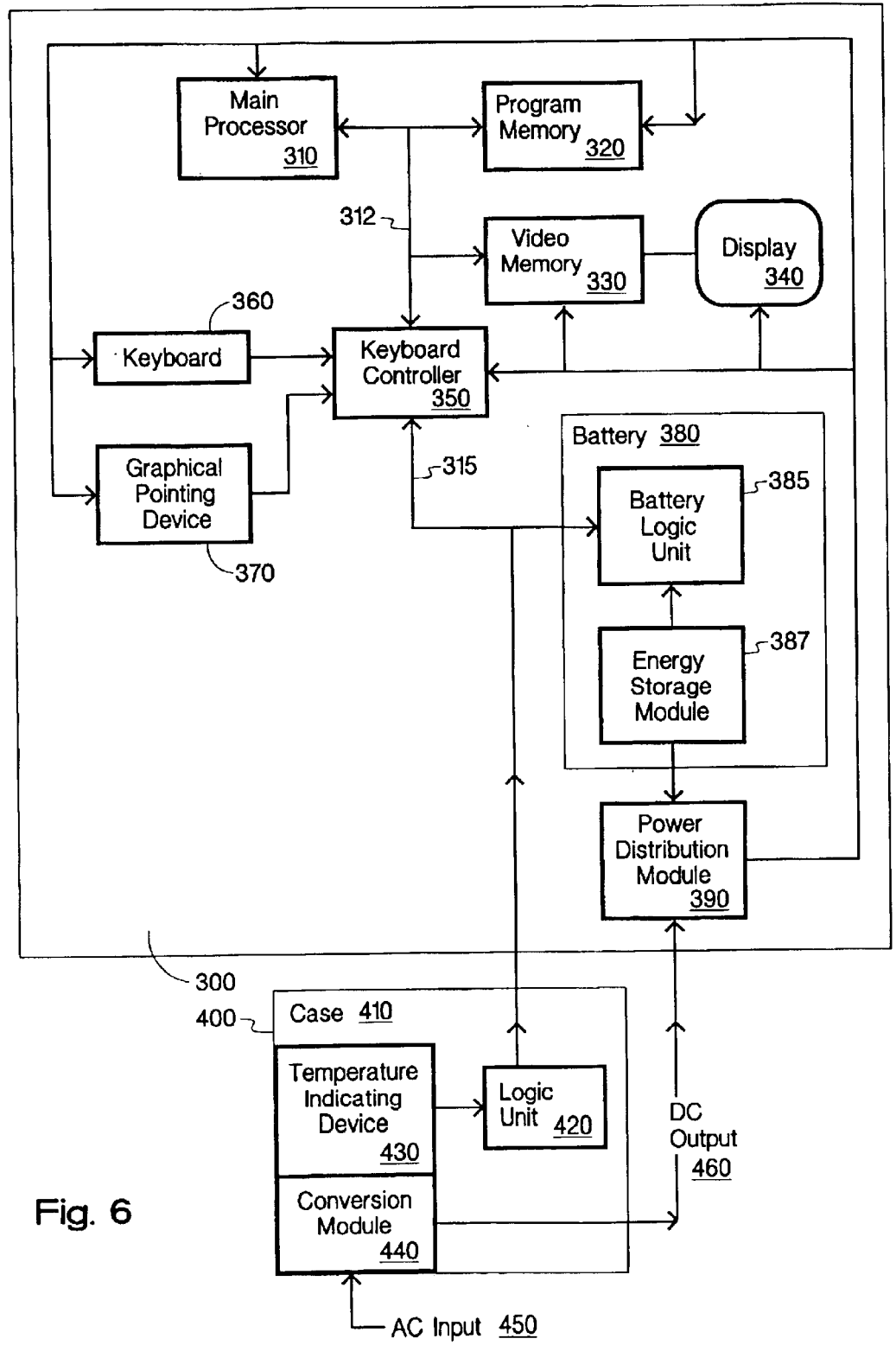
FIG. 6 is a block diagram of a portable computing unit and a power adapter that presents an indication of the temperature of the power adapter according to an alternate embodiment of the invention.

FIG. 6 is a block diagram of a portable computing unit (300) and a temperature-indicating power adapter according to another embodiment of the invention. Computing unit 300 may represent, for example, a portable laptop computer, notebook computer, or another type of electronic system. In FIG. 6, computing unit 300 includes main processor 310, which executes programs stored in program memory 320. Main processor 310 is also interfaced with video memory 330, which controls display 340.

Computing unit 300 also includes keyboard controller 350, which receives inputs from keyboard 360 as well as graphical pointing device 370. Graphical pointing device 370 may represent a mouse, touchpad, trackpad, or other device used to position a cursor or other indicator on display 340. Keyboard controller 350 includes an interface to secondary bus 315, which communicates with battery logic unit 385 of battery 380. This communication enables a logic unit within keyboard controller 350 to monitor the health and status of energy storage module 387 within battery 380. An exemplary suitable bus that is capable of performing the aforementioned secondary bus functions is the I2C (inter-integrated circuit bus) used in many portable computers. In the embodiment of FIG. 6, output power from power adapter 400 is received by power distribution module 390 and supplies power to the aforementioned elements of computing unit 300.

In the embodiment of FIG. 6, secondary bus 315 has been extended to additionally include an interface with logic unit 420 of power adapter 400. Logic unit 420 receives an input from temperature-indicating device 430, which is preferably coupled to at least a portion of case 410. Thus, as conversion module 440 increases in temperature due to the excess heat caused by the conversion of AC from input 450 to DC that is conveyed from DC output 460, the increase in the temperature of case 410 caused by the excess heat is measured by temperature-indicating device 430. Preferably, temperature-indicating device 430 includes a digital output that is conveyed through logic unit 420 to secondary bus 315. Temperature-indicating device 430 can also include a switch that interrupts the direct current output from conversion module 440 in the event that the temperature of case 410 exceeds a predetermined value.

The temperature reported from temperature-indicating device 430 can thus be received by keyboard controller 350 and monitored in a manner that accords with the monitoring of battery 380. The temperature information from power adapter 400 can then be reformatted by keyboard controller 350, inserted into the bus traffic along primary bus 312, and displayed to the user by way of display 340 through video memory 330. Alternatively, keyboard controller 350 can indicate the reported temperature to main processor 310, thereby allowing the main processor to control the display of the reported temperature information along with other information displayed to the user of computing unit 300.

Figure 7:
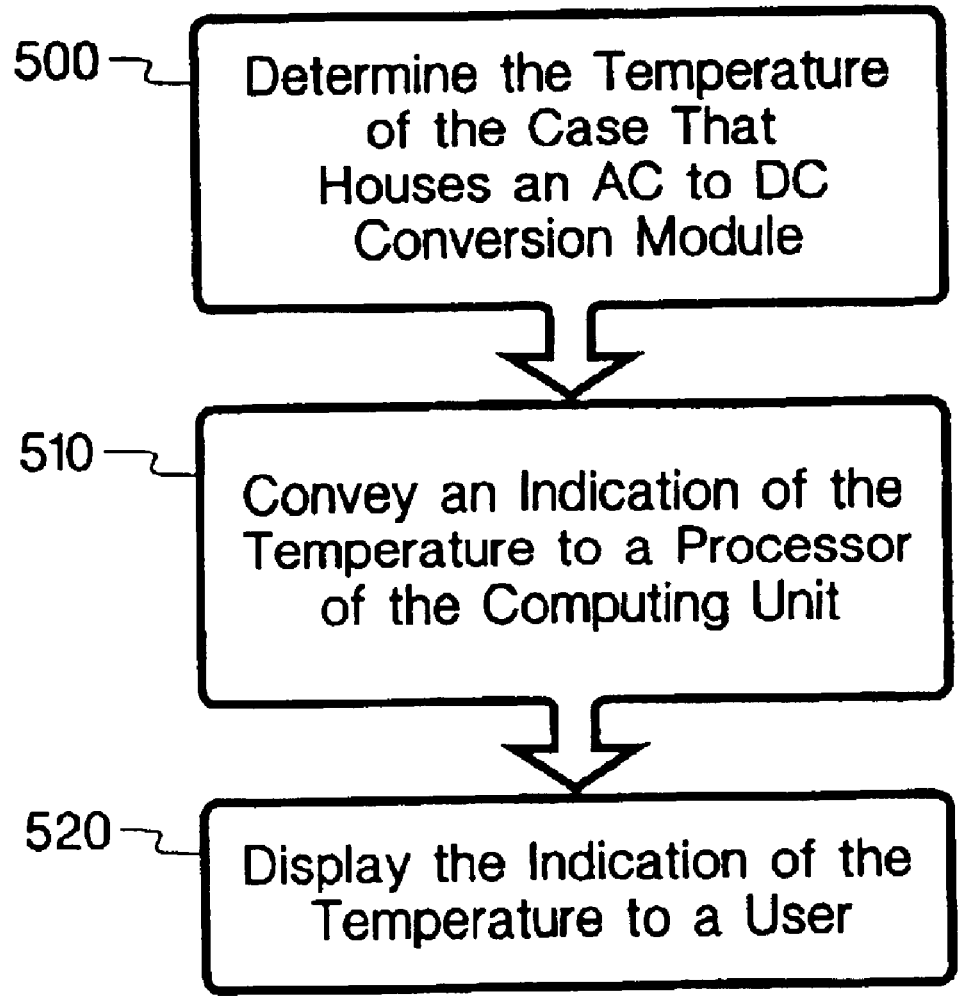
FIG. 7 is a flowchart of a method of indicating that a power adapter has increased in temperature beyond a predetermined value according to an embodiment of the invention.

FIG. 7 is a method of conveying a temperature of a power adapter to a user in accordance with the embodiment of FIG. 6. The method of FIG. 7 begins at step 500, which includes determining the temperature the case that houses an AC to DC conversion module supplying current to the computer unit. A thermometer having a digital output, such as temperature-indicating device 430 of FIG. 6, can perform step 500. In this embodiment, the output represents an actual measurement of the temperature of a portion of the case of the power adapter. Alternatively, a device that includes a comparator having a high/low output in a manner that accords with the circuit of FIG. 4 can perform step 500. In this embodiment, the output of the comparator is used to drive logic unit 420 to indicate a case temperature that is either within or outside of the normal temperature range.

The method of FIG. 7 continues at step 510 in which the indication of the temperature is conveyed to a processor of the computing unit. Step 510 may include transmitting a measurement of the actual temperature, or may include transmitting a signal that indicates that the temperature is either within or outside of a normal range. The signal can be transmitted using an I2C bus or by way of another type of bus.

The method continues at step 520 in which an indication of the temperature is displayed to the user. The display of step 520 may include only displaying the temperature in the event that the indicated temperature has exceeded a predetermined a level, thus only requiring that the user be notified only during an out-of-range condition.

While the present invention has been particularly shown and described with reference to the foregoing preferred and alternative embodiments, those skilled in the art will understand that many variations may be made therein without departing from the spirit and scope of the invention as defined in the following claims. This description of the invention should be understood to include the novel and non-obvious combinations of elements described herein, and claims may be presented in this or a later application to any novel and non-obvious combination of these elements. The foregoing embodiments are illustrative, and no single feature or element is essential to all possible combinations that may be claimed in this or a later application. Where the claims recite "a" or "a first" element or the equivalent thereof, such claims should be understood to include incorporation of one or more such elements, neither requiring nor excluding two or more such elements.

What is claimed is:

1. A temperature-indicating power adapter comprising:

a case;

a conversion module coupled to the case that receives a first voltage and produces a second voltage, the case dissipating at least some of the heat generated by the conversion module;

a temperature-indicating device also coupled to the case for indicating the temperature of the case, wherein the temperature of the case increases due to the heat produced from a conversion of the first voltage into the second voltage;

wherein the temperature-indicating device comprises:

a temperature sensitive resistor that changes resistivity in response to a change in the temperature of the case;

a comparator coupled to the temperature sensitive resistor and configured to generate an output based upon the resistivity of the temperature sensitive resistor;

a diode;

a transistor coupled to the diode and the comparator, the transistor configured to switch a state of the diode based upon the output of the comparator;

a second diode; and a second transistor coupled to the second diode and the comparator, the second transistor configured to switch a state of the second diode based upon the output of the comparator, wherein the second diode has a state that is opposite to the state of the other diode.

2. The temperature-indicating power adapter of claim 1, wherein the temperature-indicating device presents a first visual indication for case temperatures within a first temperature range and a second visual indication for case temperatures within a second temperature range.

3. The temperature-indicating power adapter of claim 1, wherein the first voltage is conveyed to the temperature-indicating power adapter using an alternating current and wherein the second voltage is conveyed from the power adapter using a direct current.

4. The power adapter of claim 1, further comprising a switch coupled to the temperature-indicating device, the switch interrupting current produced at the second voltage by the conversion module.

5. The power adapter of claim 1, further comprising:

a switch coupled to the temperature-indicating device, where the switch interrupts current associated with the second voltage if the temperature of the case increases beyond a predetermined amount.

6. The temperature-indicating power adapter of claim 1, wherein the temperature-indicating device produces a visual indication of the temperature of the case.

7. The temperature-indicating power adapter of claim 6, wherein the temperature-indicating device includes at least one light-emitting diode.

8. A temperature-indicating power adapter comprising:

means for converting an alternating current voltage input to a direct current output;

means for housing the means for converting;

means for visually indicating the temperature of the means for housing the means for converting, wherein the means for housing the means for converting dissipates at least some of the heat generated by the means for converting and wherein the temperature of the means for housing increases due to the heat produced from a conversion of the alternating current voltage input into the direct current output;

wherein the means for visually indicating the temperature comprises:

a temperature sensitive resistor that changes resistivity in response to a change in the temperature of the means for housing;

a comparator coupled to the temperature sensitive resistor and configured to generate an output based upon the resistivity of the temperature sensitive resistor;

a first diode;

a transistor coupled to the first diode and the comparator, the transistor configured to switch a state of the first diode based upon the output of the comparator;

a second diode; and a second transistor coupled to the second diode and the comparator, the second transistor configured to switch a state of the second diode based upon the output of the comparator, wherein the second diode has a state that is opposite to the state of the first diode.

9. The temperature-indicating power adapter of claim 8, further comprising means for interrupting the direct current output, the means for interrupting the direct current output being coupled to the means for visually indicating the temperature.

10. The temperature-indicating power adapter of claim 8, wherein the means for visually indicating the temperature comprises:

switching means for interrupting the direct current output if the temperature of the means for housing increases beyond a predetermined amount.

11. The temperature-indicating power adapter of claim 8, wherein the first diode includes a light source that indicates that the temperature of the housing is below a predetermined value.

12. The temperature-indicating power adapter of claim 11, wherein the second diode includes a second light source that indicates that the temperature of the housing is above the predetermined value.

13. The temperature-indicating power adapter of claim 8, wherein the temperature sensitive resistor a coupled to a portion of the means for housing the means for converting, the temperature sensitive resistor undergoing a change in resistivity as the portion of the means for housing changes in temperature.

14. The temperature-indicating power adapter of claim 13, wherein the temperature sensitive resistor reduces resistivity as the portion of the housing increases in temperature.

15. The temperature-indicating power adapter of claim 13, wherein the temperature sensitive resistor increases resistivity as the portion of the means for housing increases in temperature.

* * * * *